Figure 1:
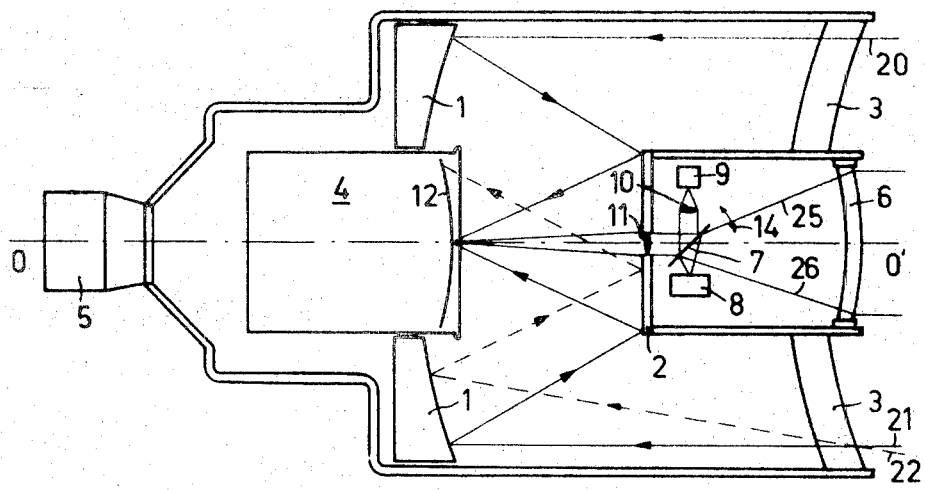

ature different from that of its surroundings is present in the central part of the field of view of the telescope. Thus, objects may be observed even at a dim scene illumination.

United States Patent [19]
deBrey et al.

[11] 3,745,347
[45] July 10, 1973

[54] TELESCOPE INCLUDING AN IMAGING SYSTEM FOR RADIATION IN THE VISIBLE RANGE

[75] Inventors: Heinrich deBrey, Eindhoven; Pieter Roos, Emmasingel, Eindhoven, both of Netherlands

[73] Assignee: U.S. Philips Corporation, New York, N.Y.

[22] Filed: Nov. 26, 1971

[21] Appl. No.: 202,429

[30] Foreign Application Priority Data
Dec. 3, 1970 Netherlands .................... 7017658

[52] U.S. Cl. .................... 250/83.3 H, 250/83.3 HP
[51] Int. Cl. .................................................. G01j 5/02
[58] Field of Search ................ 250/83.3 H, 83.3 HP

[56] References Cited
UNITED STATES PATENTS

| 3,509,344 | 4/1970 | Bowers | 250/83.3 HP |
| 3,124,682 | 3/1964 | Kojima et al. | 250/83.3 HP X |
| 2,825,815 | 3/1958 | Ario | 250/83.3 H |
| 2,716,193 | 8/1955 | Riolo | 250/83.3 HP X |

*Primary Examiner*—Archie R. Borchelt
*Attorney*—Frank R. Trifari

[57] ABSTRACT

A telescope containing an imaging system for radiation in the visible range is described. The telescope is provided with a device which indicates whether an object having a temperature different from that of its surroundings is present in the central part of the field of view of the telescope. Thus, objects may be observed even at a dim scene illumination.

7 Claims, 4 Drawing Figures

Patented July 10, 1973  3,745,347

2 Sheets-Sheet 1

INVENTORS
HEINRICH DE BREY
PIETER ROOS
BY
AGENT

Patented July 10, 1973 3,745,347

2 Sheets-Sheet 2

INVENTORS
HEINRICH DE BREY
BY PIETER ROOS

AGENT

TELESCOPE INCLUDING AN IMAGING SYSTEM FOR RADIATION IN THE VISIBLE RANGE

The invention relates to a telescope including an imaging system for radiation in the visible range, which system comprises a first and a second mirror and at least one correcting element.

Such telescopes are frequently used for observing a poorly illuminated scene at night. For this purpose the night telescopes are provided with a luminance intensifier tube which intensifies the light from the moon and stars available at night so as to produce a high-luminance image.

The light from the moon and stars, however, hardly penetrates through foliage, so that objects under trees or in bushes remain substantially invisible. Also, viewing results will be very poor when the light from the moon and stars is dim.

It is an object of the invention to provide an improved night telescope. The telescope according to the invention is characterized by the provision of an apparatus which indicates whether in the central part of the field of view of the telescope there is an object which has a temperature differing from that of its surroundings, which apparatus comprises an optical transducer system for infrared radiation the optical axis of which coincides with the optical axis of the imaging system for the visible radiation, a detection device sensitive to infrared radiation and an indicating device which is controlled by the detection device and is capable of projecting a light spot in the central part of the visible image formed by the telescope. The term "infrared radiation" is used in this specification to mean radiation the wavelength of which lies in the range from 1 to 15 $\mu m$. This telescope enables a terrain to be scanned in the usual manner at night. When at the center of the field of view of the telescope an object appears which has a temperature which differs from that of its surroundings, such as an animate being or a self-propelled vehicle, a light spot is projected in the field of view of the observer. The observer then knows that his telescope is pointed at an object, even if initially he cannot perceive the image of this object with the system for visible radiation.

Thus, the telescope may be used as a telescopic sight. Owing to the coaxial construction of the systems for infrared radiation and visible radiation the telescope is small-sized, so that it may readily be mounted on guns and rifles. However, the telescope may also be advantageously used for normal observation of objects having a temperature which differs from that of the surroundings, for an observer is more likely to see an object when he knows that there really is an object than when he is not sure whether there is an object. When a telescope according to the invention is provided with suitable filters adapted to daylight it may also be used to detect camouflaged hot objects in daytime.

It should be noted that it is known, inter alia from U.K. Patent Specification No. 1,150,976, to combine a telescope for visible radiation with an infrared system in which a source of visible radiation is controlled by an infrared-sensitive detector cell. The infrared system of the known apparatus has the task of forming a complete infrared image of the scene to be observed. The images of the system for visible radiation and from the system for infrared radiation are superposed on one another. The known apparatus offers much information, but it is complicated and expensive. There is a demand for an improved night telescope for visible radiation which need not give an infrared image of the scene and is simple and not too expensive. The telescope according to the invention fulfils these requirements by using an auxiliary system which responds to infrared radiation. In the telescope described in the U.K. Patent Specification No. 1,150,976 the systems for visible radiation and for infrared radiation are arranged parallel to one another, whereas in the telescope according to the invention these systems are coaxial and are partly combined.

It should be noted that German Patent Specification No. 1,230,592 describes an arrangement in which the optical axes of the imaging system for visible radiation and of the transducer system for infrared radiation coincide. But in this arrangement also the infrared system produces a complete image of the scene to be observed. Moreover, the visible-radiation image and the infrared-radiation image are not formed simultaneously.

A first preferred embodiment of a telescope according to the invention is characterized in that the transducer system for infrared radiation comprises, in the order of enumeration, an objective which transmits infrared radiation and is mounted in a central opening in the correcting element for visible radiation, and a plane mirror, the indicating device including a plane mirror which can reflect the visible radiation emitted by a source of light to the center of the image formed by the imaging system for visible radiation.

Preferably the plane mirrors of the transducer system for infrared radiation and of the indicating device are arranged to oscillate through a small angle about an axis at right angles to the optical axis of the objective. This enables the field of view to be scanned through a small angle in a direction at right angles to the optical axis. The said mirrors have no image-forming function, in contradistinction to, for example, the concave mirror of the telescope described in U.K. Patent Specification No. 1,150,976.

A second embodiment of a telescope according to the invention is characterized in that the transducer system for infrared radiation includes a dichromatic reflecting layer which is provided on the correcting element and largely reflects the infrared radiation to the detection device and largely transmits the visible radiation.

The optical surfaces required for dealing with the visible radiation may all be provided on a single member made of a material which largely transmits visible radiation.

In a further embodiment of a telescope according to the invention the transducer system for infrared radiation includes the elements of the imaging system for visible radiation, the last mirror in the radiation path consisting of a material which reflects visible radiation and transmits infrared radiation.

The detection system for infrared radiation may comprise, in addition to a first detector cell, at least one reference detector cell. By means of the or each reference cell the influence of the infrared background radiation on the radiation of the object to be perceived may be eliminated in a suitable electronic circuit arrangement.

Figure 2:
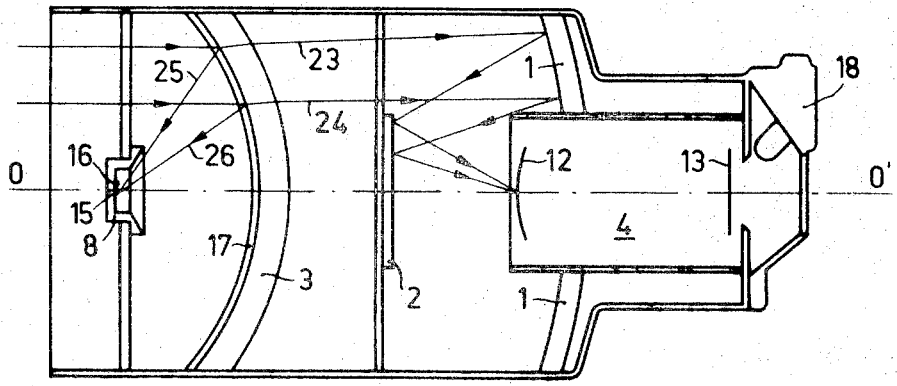
Figure 3:
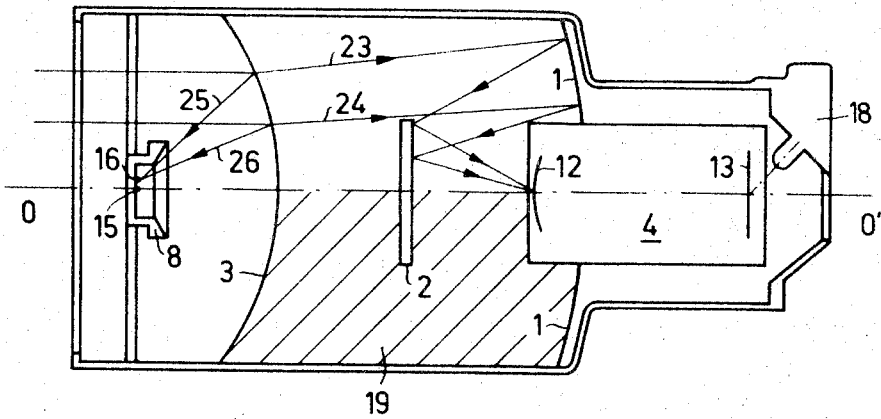
Figure 4:
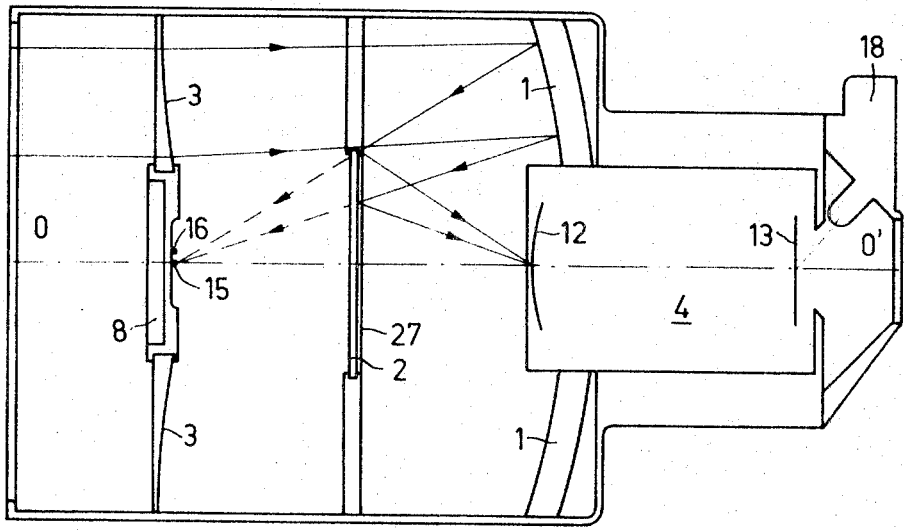

Embodiments of the invention will now be described, by way of example, with reference to the accompanying diagrammatic drawings, in which:

FIG. 1 is a sectional view of a telescope according to the invention in which the imaging system for visible radiation and the transducer system for infrared radiation are separate, and FIGS. 2, 3 and 4 are sectional views of embodiments in which the systems are combined.

In the figures, like elements are designated by corresponding reference numerals.

In the telescope shown in FIG. 1 a separate lens 6 for infrared radiation is provided. The imaging system for the visible radiation comprises a concave spherical mirror 1 and a plane mirror 2. An aspherical correcting plate 3 provides a correction of the spherical aberration of the mirrors 1 and 2. Rays 20, 21 and 22 shown by way of example are reflected by the mirror 1 to the mirror 2. The mirror 2 in turn reflects the rays to a photocathode 12 of the luminance intensifier tube 4. The intensified image is observed through an eye-piece 5.

An infrared objective 6 is mounted in an opening in the correcting plate 3 around the optical axis 00'.

This objective is made of a material which has satisfactory transmission in the wavelength range of from 1 μm to 15 μm, such as zinc sulphide. The infrared rays transmitted by the objective 6 are reflected to an infrared detector 8 by an element 7 the surface of which facing the objective may be coated with aluminium. The output signal of this detector is amplified in an amplifier circuit, not shown, and the amplified signal controls a light source 9, which may be a GaAs photodiode and emits visible radiation.

The rays emitted by the photo-diode 9 are reflected to the photocathode 12 of the luminance intensifier tube 4 by a mirror for visible light. This mirror may be the surface of the element 7 which faces away from the objective 6 and is coated with a reflecting layer. Lenses 10 and 11 ensure the formation of a sharply defined image on the photocathode.

In order to enable a given part of the terrain to be rapidly scoured by means of the heat detection system, the element 7 is mounted for oscillating movement about an axis at right angles to the plane of the drawing, as is indicated by an arrow 14. The element 7 may oscillate, for example, through an angle of 1° so that a range of 2° is vertically swept. The diameter of the field of view of the system for visible radiation subtends an angle of 10°.

Since the oscillating plane mirror of the transducer system for infrared radiation is combined with that of the indication system, these systems are directly coupled so that the form of the oscillating motion is insignificant. The element 7 may be caused to oscillate by simple means; a magnet together with a coil and a resonant circuit is sufficient.

Thus, the total image produced by the telescope consists of the normal image produced by a telescope for visible radiation and, superposed thereon, a luminous line when the element 7 oscillates or a luminous spot when the element 7 is stationary.

For a telescope of the above-described type the minimum temperature difference it can detect, at a geometrical resolution of 5 mrad, is about 0.5°C.

In the telescope shown in FIG. 1 the transducer system for infrared radiation is separate from the imaging system for visible radiation. In the embodiments shown in FIGS. 2, 3 and 4 one or more elements of the visible-radiation system form part also of the infrared-radiation transducer system.

For example, in the telescope shown in FIG. 2 one surface of the correcting element 3 is coated with a dichromatic reflecting layer 17. Rays 23 and 24 having wavelengths in the visible range travel the same paths in the telescope as they would in the telescope shown in FIG. 1, because the layer 17 transmits visible radiation substantially completely. Infrared rays 25 and 26, however, are reflected substantially completely by the layer 17 to a detector cell 15 of the detection device 8. In view of the focussing on the detector cell the surface of the correcting element which is coated with the layer 17 has a parabolic shape.

The field of view of the telescope for visible radiation is about 10 times that of the heat detector. This ensures that at the center of the luminance intensifier image a small area with thermal information is offered.

When the received heat radiation exceeds a given intensity a device 18 is rendered operative. This device produces visible radiation and is imaged as a light spot on a screen 13 of the brightness intensifier tube 4 by means of a suitable optical system.

The influence of background radiation may be eliminated by using, in addition to the signal detection cell 14 proper, at least one reference cell, such as a cell 16, and by electronically comparing the output signals of the cells.

Alternatively, as is shown in FIG. 3, the optical surfaces required for forming an image of the scene on the photocathode of the brightness intensifier tube may be provided on a single member 19. This member 19 may consist of a polymethyl metacrylate which has a low absorption for visible radiation.

In the telescope shown in FIG. 4 the detection device 8 is inserted in the ray path behind the plane mirror 2. The correcting element 3 is a Schmidt plate having one aspherical surface and is made of a material having a low absorption both for visible and for infrared radiations, for example zinc selenide. The plane mirror 2 is made of a material having a low absorption for infrared radiation, for example zinc sulphide. One surface of the mirror is coated with a dichromatic reflecting layer 27 which largely reflects the visible radiation but largely transmits the infrared radiation.

What is claimed is:

1. A thermal difference indicating telescope, comprising an image intensifier, an optical system having at least two mirrors for projecting an image of a scene on the image intensifier, the optical system having an imaginary optic axis, a correcting element for compensation of aberrations in the optical system, infrared transducing means having an imaginary optic axis coaxially with the optic axis of the optical system for detecting thermal differences between an area in the central portion of the image and the remainder of the image, and indicating means connected to the transducer means for projecting a spot of light on the center of the visible image on the image intensifier in response to an indication of a thermal difference between the central portion of the image and the remainder of the image.

2. Telescope as claimed in claim 1, wherein the transducer means for infrared radiation comprises, in the order of enumeration, an objective which transmits infrared radiation and is mounted in a central opening in the correcting element for visible radiation, and a plane mirror, the indicating means including a plane mirror which can reflect the visible radiation emitted by a source of light to the center of the image formed by the imaging system for visible radiation.

3. Telescope as claimed in claim 2, wherein the plane mirrors of the transducer for infrared radiation and of the indicating means are arranged to oscillate through a small angle, about an axis at right angles to the optical axis of the optical system.

4. Telescope as claimed in claim 1, wherein the transducer means for infrared radiation includes a dichromatic reflecting layer which is provided on the correcting element and largely reflects the infrared radiation to the detection device and largely transmits the visible radiation.

5. Telescope as claimed in claim 4, wherein all the optical surfaces required to deal with the visible radiation are provided on a single member made of a material which largely transmits visible radiation.

6. Telescope as claimed in claim 1, wherein the transducer means for infrared radiation includes the elements of the imaging system for visible radiation, the last mirror in the radiation path consisting of a material which reflects visible radiation and transmits infrared radiation.

7. Telescope as claimed in claim 4, wherein the detection device for infrared radiation comprises, a signal detector cell, and a reference detector cell.

* * * * *

PO-1050
(5/69)

UNITED STATES PATENT OFFICE
CERTIFICATE OF CORRECTION

Patent No. 3,745,347                     Dated July 10, 1973

Inventor(s) HEINRICH DEBREY and PIETER ROCS

It is certified that error appears in the above-identified patent and that said Letters Patent are hereby corrected as shown below:

IN THE CLAIMS

Claim 3, line 2, after "transducer" insert --means--.

Signed and sealed this 27th day of November 1973.

(SEAL)
Attest:

EDWARD M.FLETCHER,JR.                    RENE D. TEGTMEYER
Attesting Officer                        Acting Commissioner of Patents